B. W. TUCKER.
MACHINE FOR FOLDING COLLARS, &c.
APPLICATION FILED MAY 29, 1908.

1,086,419.

Patented Feb. 10, 1914.
8 SHEETS—SHEET 8.

Witnesses
E. M. Daso.
A. Redmond.

Inventor
B. W. Tucker
By his Attorneys
Criswell & Criswell

UNITED STATES PATENT OFFICE.

BENJAMIN W. TUCKER, OF SOUTH ORANGE, NEW JERSEY.

MACHINE FOR FOLDING COLLARS, &c.

1,086,419.

Specification of Letters Patent.

Patented Feb. 10, 1914.

Application filed May 29, 1908. Serial No. 435,763.

*To all whom it may concern:*

Be it known that I, BENJAMIN W. TUCKER, a citizen of the United States, and a resident of South Orange, county of Essex, and State of New Jersey, have invented certain new and useful Improvements in Machines for Folding Collars, &c., of which the following is a full, clear, and exact description.

This invention relates more particularly to machinery for folding the blanks of collars and cuffs.

The primary object of the invention is to provide a simple and efficient machine in which the collar blanks may have their edges turned over, and the blank thus turned, properly pressed, and the parts for folding the blank automatically operated so that it will be unnecessary for the attendant at the machine to handle the article after it has once been placed in position for folding, thus materially saving time, and leaving the attendant's hands entirely free for other purposes, and at the same time folding the blanks more rapidly than is accomplished by machinery of this class as ordinarily constructed.

A further object of the invention is to provide simple and efficient means which will remove the collar and other blanks after being folded, and automatically deposit them on a receiver ready for removal and properly stacked, and to provide means whereby all the parts may be operated from a single drive shaft.

With these and other objects in view, the invention will be hereinafter more particularly described with reference to the accompanying drawings which form a part of this specification, and will then be pointed out in the claims at the end of the description.

In the drawings, Fig. 6ª shows the cam for operating the means shown in Fig. 6. Fig. 14ª shows part of the means for elevating the templet or former.

While I have shown the invention as having the parts entirely automatic, it will be understood that some or all of the parts may be operated by hand if desired, or the arrangement of the parts changed, and that some of the features herein shown may be employed in connection with other machines adapted for folding similar articles.

The frame 10 may be of any suitable construction, and may have a base 11 and supporting arms or brackets 12, and to the brackets 12 may be secured uprights or standards 13 on which is arranged a supporting bed or table 14. Above the table or bed 14 is a templet frame or support 15 which is vertically movable, and may be guided at its ends on the rods or shafts 16 which pass through opening in the lugs 17 of said support. This support 15 has a guiding bed, plate or member 18 which may be of the usual or of any preferred construction, and which is adapted to have suitable templet plates movable thereon which are adapted to define the shape of the article to be folded. As shown, a plate 19 of thin metal is secured to the guiding bed 18 of the support 15, and arranged so as to move relatively thereto are a plurality of plates 20, 21, 22 and 23 forming a part of the templet 23ª. These latter plates are also of thin material, and are each secured to a slide 24 which may comprise two members 25 and 26 which are adjustable relatively to each other by means of the slots 26ª and screws or bolts 26ᵇ so that the movable members of the templet or former may be lengthened or shortened according to the length of the collar or other article, the shape of the plates being varied according to the nature of the article to be folded. The member 25 of the templet plate 20 is secured to a diagonally movable plate, block or slide 27, the member 25 of the plate 21 to a slide 28. The member 25 of the plate 22 to a slide or block 29, and the member 25 of the plate 23 of the templet to a slide or block 30. The slides or blocks of the several templet plates, intersect each other in pairs, and are movable one above the other, and blocks 27 and 28 are connected by the transverse or cross-bars 31 to work in unison, while the blocks 29 and 30 are connected by the transverse bar 32 to cause said blocks to move in unison and either inwardly or outwardly to collapse or expand the templet plates as is usual in machines of this character. The transverse bars fit grooves in the slides or blocks to permit them to move relatively to each other, and the transverse bar 32 is connected by a link 33 to one end of a lever 34, and the other end of said lever is connected by a link 35 to the transverse bar 31, and said lever 34 is located under the templet bed 15, and is secured to a vertically movable shaft 36. This shaft 36 is held to rotate in and move with the support 15 by a pin or otherwise and is held in a rotatable sleeve 37, and this sleeve is journaled in a boss forming a part of the table 14 of the machine frame, and on the end of said sleeve is a bevel gear 38. The shaft 36 is provided with a key 39 by which the said shaft may be rotated and at the same time move vertically in the sleeve 37 with the templet and in mesh with the gear 38 is a bevel gear 40 which, when partly rotated, will rotate the shaft 36 and move the lever 34 to operate the links 33 and 35 so as to force the templet plates 20, 21, 22 and 23 either inward or outward to expand or collapse the same according to the direction of movement of the gears 38 and 40.

To elevate the templet plates and the frame carrying the same, and to rotate the gears 38 and 40 any suitable means may be employed. The gear 40 may be secured to a shaft 41, and to the shaft is secured an arm 42, and held to the outer end of said arm is a link 43, the latter being secured to one end of a lever 44, and this lever being pivoted at 45, and having its lower end provided with a roll 46 or other means adapted to enter the groove of a cam 47 which is secured to the main drive shaft 48. As will be seen when the latter shaft rotates, the cam will rock the lever 44 on its pivot and through the link 43 and arm 42 will rock the shaft 41 and rotate the gears 38 and 40, and through the mechanism previously described will force the sliding blocks of the templet-operating means inward or outward, and thereby expand or collapse the templet plates. The templet plates and frame may be vertically moved by one or more links 49 secured to the under part of the templet guide-plate or bed 15, and which have their lower ends secured to the arms 50. These arms 50 are secured to a shaft 51, and at one end of the shaft is a short arm 52 which is connected by a link 53 to a lever 54, the latter being pivoted at 45 and having its lower end at 56 provided with a roll which enters a groove in a cam 57 carried by the main drive shaft 48, so that as the latter is rotated the lever 54 through the shaft 51, arms 50 and links 49 will elevate or lower the templet frame and templet plates at the proper time.

Figure 8:
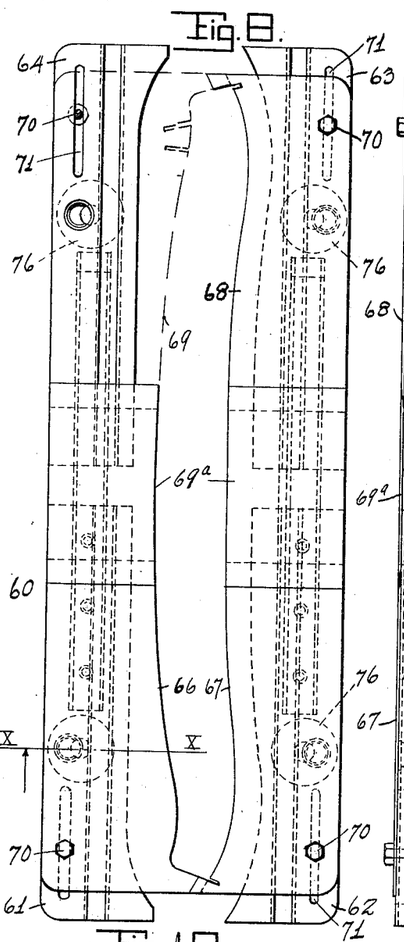
Fig. 8 is a plan view with a part thereof removed of the means for infolding the blank.
Figure 9:
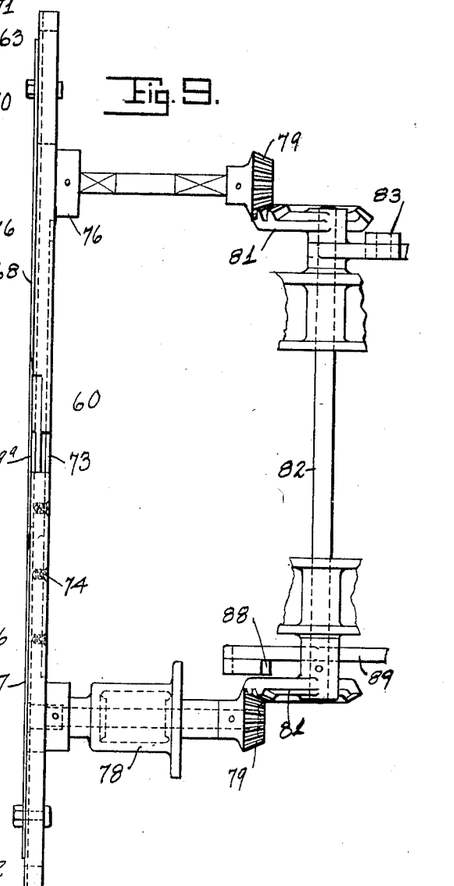
Fig. 9 is a front view of the infolders and part of the operating mechanism therefor.
Figure 10:
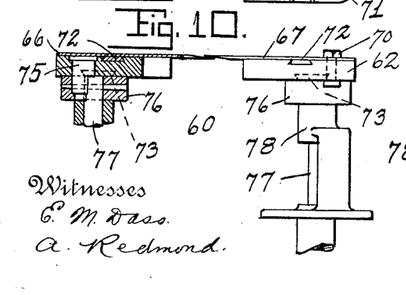
Fig. 10 is a fragmentary view, partly in section and partly in elevation, of the infolders and means for operating the same.
Figure 11:
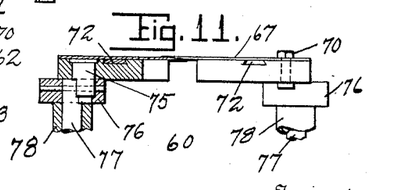
Fig. 11 is a view similar to Fig. 10, except that the infolders are shown in their inner or folding position.
Figures 12, 13, 14, 15, 16:
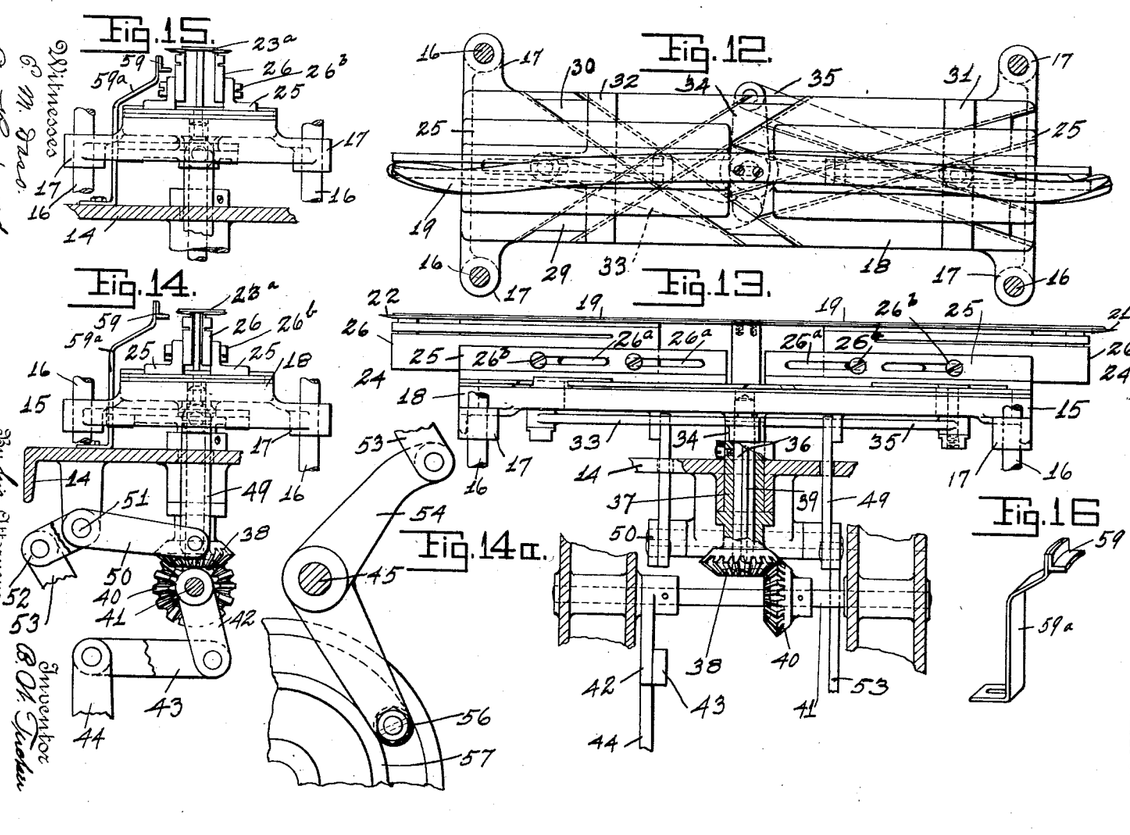
Fig. 12 is a plan view of the templet or former, with the operating means therefor and shown in a collapsed position.
Fig. 13 is a front elevation of the templet and part of the operating means.
Fig. 14 is a side view, partly in section, showing part of the mechanism for operating the templet plates and support.
Fig. 15 is a view similar to Fig. 14, except that the templet is shown in its raised or elevated position.
Fig. 16 is a detail perspective view of one of the initial guides or gages for the collar blank.

The templet plates are normally in a lowered position, and the blanks of the collar or other articles are placed thereon, and adjacent to the templet plates when in a lowered position are the gages 59. These gages 59 may be angular in form and are supported by the brackets or uprights 59ª so as to be adjustably secured to the frame table and serve to properly position the blanks on the templet plates before the latter are elevated, and as the templet plates are elevated as previously described, the blanks are forced between and above the infolding mechanism 60, the latter being shown in detail in Figs. 8 to 11. This infolding mechanism may be of the usual or of any preferred construction. As shown a plurality of movable blocks or members 61, 62, 63 and 64 are slidingly held above the brackets or standards 65 which are secured to the frame bed or table 14, and adjustably secured to the movable blocks or members are the infolding plates 66, 67, 68 and 69 respectively, which are spaced apart in pairs by the plates 69ᵃ. In Fig. 8 the folding plate or member 69 is removed and the inner edge of the plates are made to conform substantially to the shape of the article to be folded, and are each secured to the blocks by means of bolts 70 which pass through slots 71 in said blocks. Each infolding plate or member is provided with a dovetailed rib 72 which is movable in a longitudinally-arranged slot formed in the upper surface of each block to guide the infolding plate when the same is adjusted. The blocks 61 to 64 are arranged in pairs so as to move together and the blocks 61 and 64 form one pair, and the blocks 62 and 63 a second pair which are opposed to blocks 61 and 64, and each pair are joined together by a slide 73 which is secured by means of bolts or screws, as 74, to one of the blocks, and is movable in a groove in the other block to permit said blocks to move toward each other and to hold the same in parallel relation to move in unison. Each block is provided with an aperture in which is arranged an eccentric or eccentrically arranged pin 75 which projects from a disk or head 76 arranged on a vertical shaft 77. Each shaft 77 is journaled in a sleeve 78 supported above the table or bed 14 of the machine frame, the upper edge of which forms a support for the eccentric head or disk 76, while each head forms an additional supporting means for the blocks when the latter are moved. As the shafts 77 are rotated the heads or cranks 76 will be given a like movement so that the pins 75, serving as crank pins will force the blocks and infolding plates inwardly, and during this movement owing to the sliding connection between each pair of blocks, the same will move toward or from each other according to the movement of the shafts 77, and will be kept in parallel relation during such movement. The shafts 77 are given two movements, the first movement to force the infolders inward in unison to substantially fit the templet when the plates are in an expanded position and before the templet is elevated, which intercepts or engages the overhanging part of the blank supported by the templet as the latter is elevated above the infolders, and a second movement to turn or infold the fabric at which time one pair of infolder plates moves in advance of the other pair and completes its fold before the second pair acts when the latter completes its work, after which the templet is collapsed and withdrawn.

Figure 1:
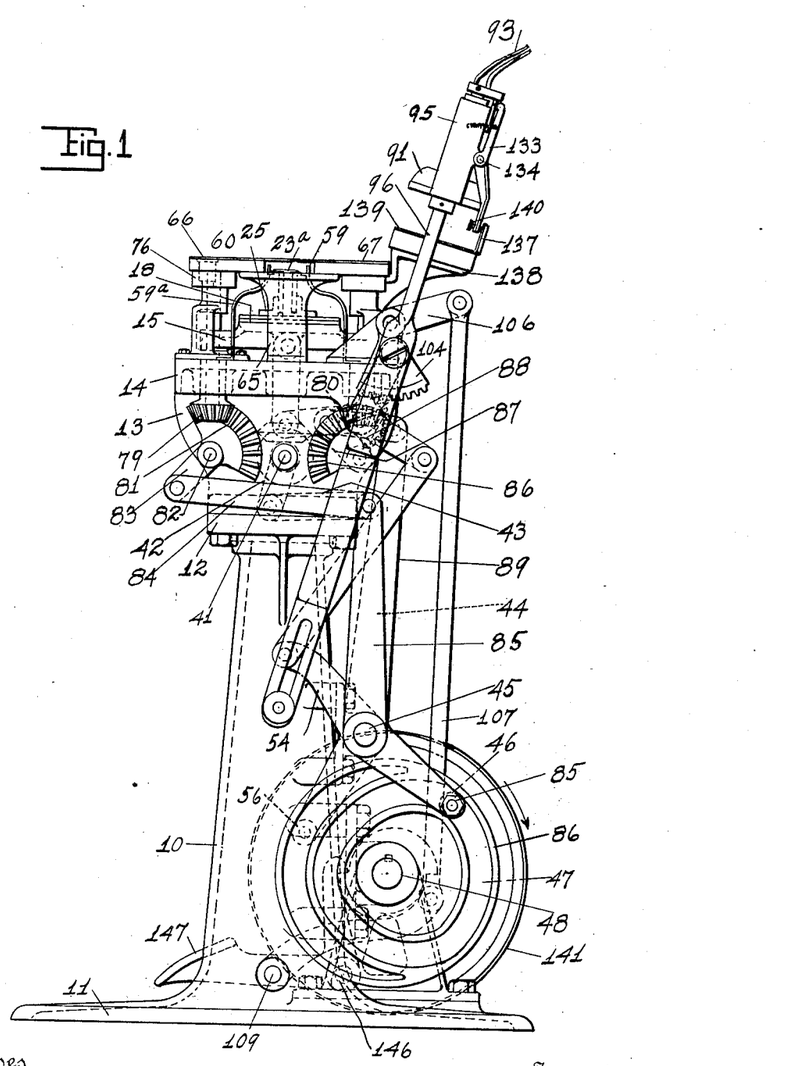
Figure 1 is a side elevation of one form of machine embodying my invention.
Figure 2:
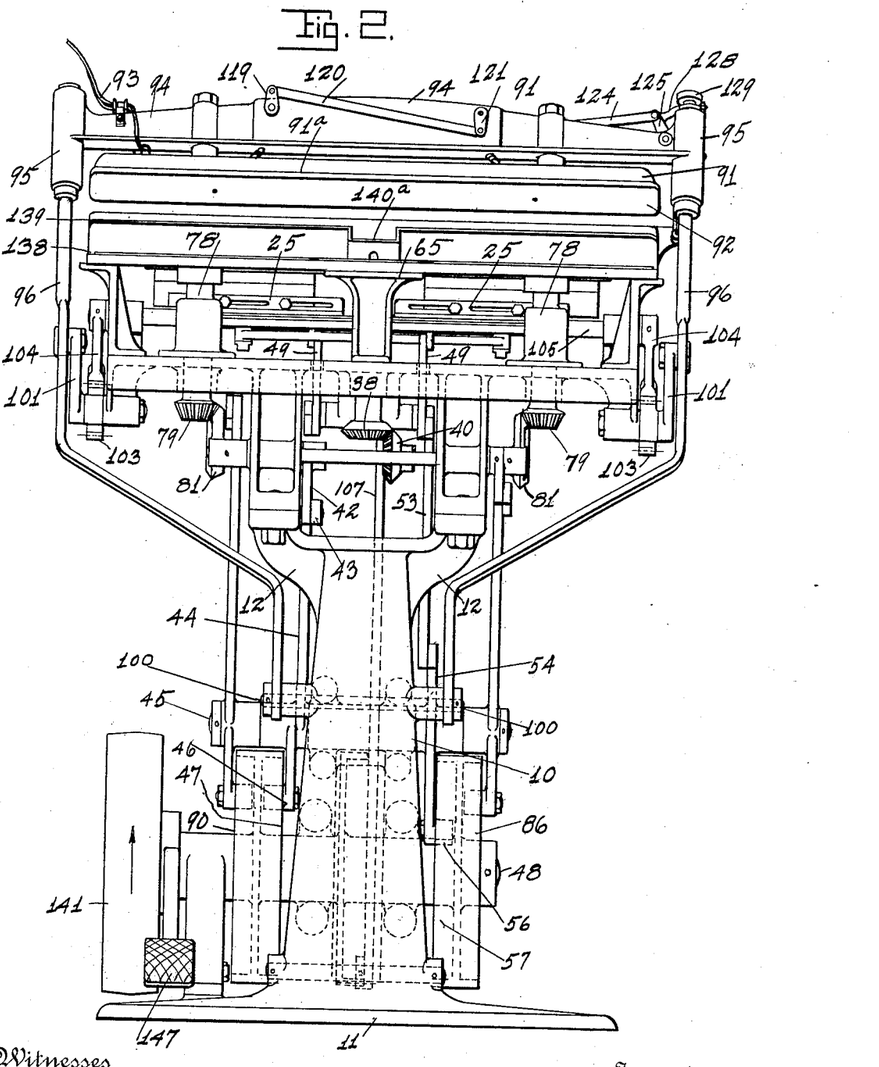
Fig. 2 is a front elevation.
Figures 17, 18, 19, 20, 21:
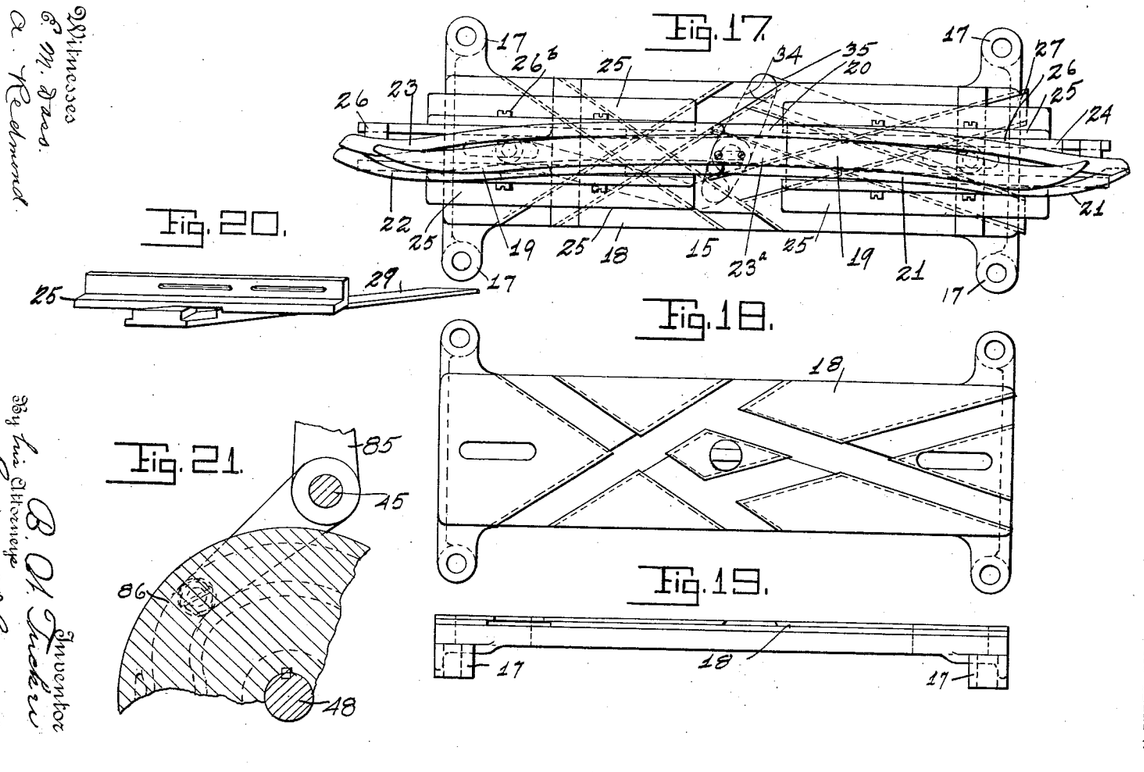
Fig. 17 is a plan view of the templet with the plates or members in an expanded position.
Fig. 18 is a detail view of the guiding bed or member of the templet.
Fig. 19 is a front view of the templet bed.
Fig. 20 is a detail perspective view of a part of the means for operating and adjusting the templet plates.
Fig. 21 is a fragmentary view, partly in section, showing the cam for operating the mechanism which opens and closes the templet plates.

To operate the shafts 77 of the infolding mechanism a gear 79 is arranged on the ends of each of the shafts moving the blocks 62 and 63, and on each shaft operating the blocks 61 and 64 is a gear 80. The gears 79 are in mesh with the segments 81 carried by a shaft 82, and to said shaft is secured an arm 83. A link 84 is connected to the arm 83 at one end and to a lever 85 at the other end, and this lever is operated by a cam 86, secured to the main drive shaft 48 as best shown in Figs. 1, 2 and 21. The gears 80, secured to the shafts 77 which operate the blocks 61 and 64, are in mesh with the segments 86, and operating these segments is an arm 87 connected by a link 88 to a lever 89. The levers 89 and 85 are pivoted or held to move on the shaft 45, and said lever 89 has one end thereof operated by a cam 90, and the lever 85 by the cam 86 both on the main drive shaft 48, so that as said drive shaft is rotated the levers 89 and 85 will operate the segments referred to and rotate the gears 79 and 80 in unison or proper sequence thus forcing the infolders inwardly to fold the blanks around the templet plates and to remove the same out of the path of movement of the templet plates at the proper time.

It is desirable that the blanks be heated and pressed after being folded around the templet plates, so that the folding edges will be clearly defined and the articles retain their folded position. For this purpose a heating and pressing head or device 91 is provided. This device is best shown in Figs. 1 to 7 and is positioned above the templet and infolding mechanism, and is normally located to the rear of the machine to permit the blanks to be readily placed on the templet plates by the attendant. The pressing and heating device may be of any suitable construction, and may be heated in any desired way. The said device 91 may have a member 91ᵃ provided with suitable electric coils within the same, which may be included in an electric circuit so as to heat the plate or table part 92 to the desired degree of heat, the said electric circuit being indicated by the wires 93 of Figs. 1 and 3, though any other heating means may be employed. The member 91ᵃ is suitably supported from a cross-head or yoke 94, and this yoke is provided with sleeves 95 at its ends in which are held the arms or rods 96. The sleeves 95 are recessed, and in said recessed portions are arranged springs 97 above which are collars 98 forming a yielding connection between the rods 96 and the cross-head or yoke 94. The arms or rods 96 have their lower ends bent inwardly and are provided with slots 99 in which the ends of a shaft 100 fit, the said shaft being held to the machine frame by which the ends of the rods are guided so as to permit the same to have a swinging upward and downward movement. An arm or lever 101 is connected to each rod 96, and said levers 101 are secured to short shafts 102 located under the table 14 at each end thereof, and on each of said shafts is a segment 103. Each segment 103 is in mesh with a larger segment 104, and the segments 104 are secured to the shaft 105, and to the shaft 105 is secured an arm 106 which is connected to a rod 107. The lower end of the rod 107 is connected to a lever 108, which is pivoted at 109 to the machine frame, and the inner end of said lever is provided with a roll or other means which enters a groove 110 in a cam 111 secured to the main drive shaft 48. As the shaft 48 is rotated the cam 111 will impart movement to the rod 107, and through the shaft 105 and the segments 104 and 103 will force the yoke 94 and the presser and heating device, and other means carried thereby, inwardly and downwardly so as to engage the blanks to properly press the fold and make the same permanent. The cam 111 is constructed to impart two motions to the presser device 91, one to engage the blank with a slight pressure, and the other with a heavy or full pressure after the templet has been withdrawn; though it will be understood that the pressure device may be made to exert a preliminary full pressure while the templet plates are in position, then relieving the pressure of said device while the templet is collapsed or removed and finally causing the device to exert a full pressure, or said device may be made to act in any other desired way.

Figure 3:
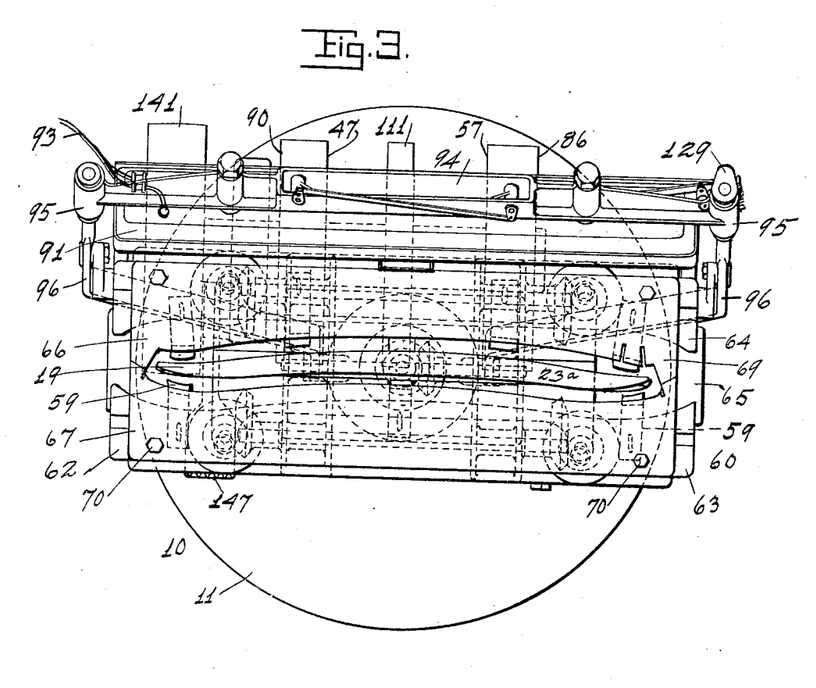
Fig. 3 is a plan view.
Figures 4, 5:
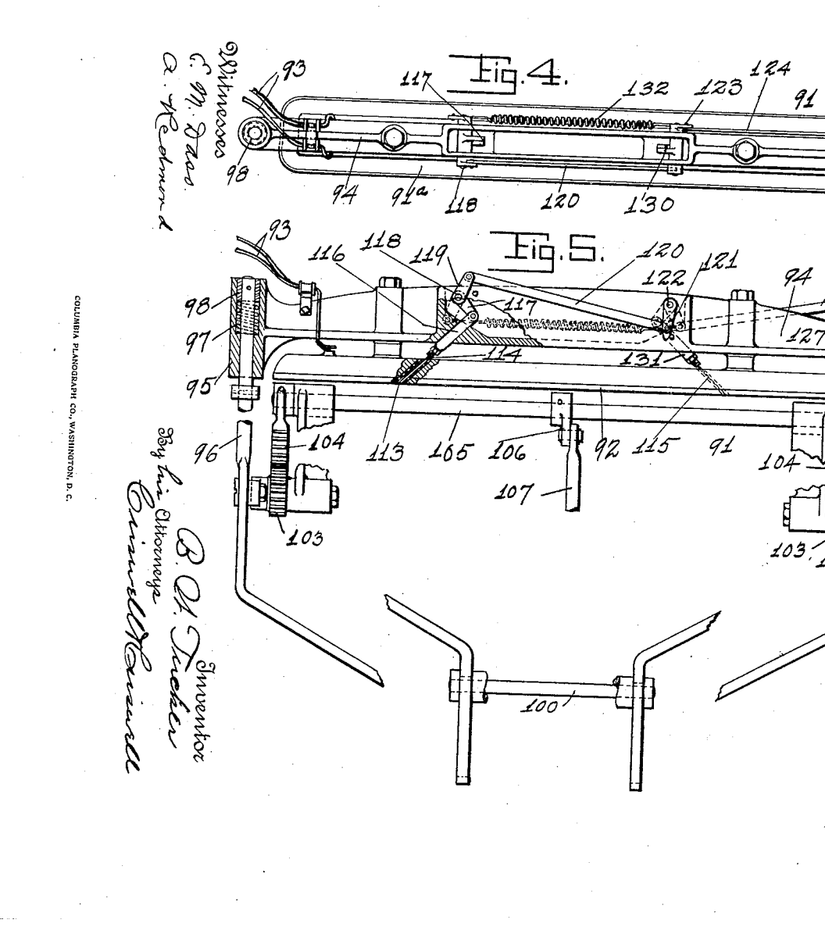
Fig. 4 is a detail plan view of the heating and pressing head and the mechanism for automatically removing the article to be folded.
Fig. 5 is a fragmentary front view, partly in section and partly in elevation, of the pressing and article removing mechanism.
Figures 22, 23, 24, 25, 26, 31, 32:
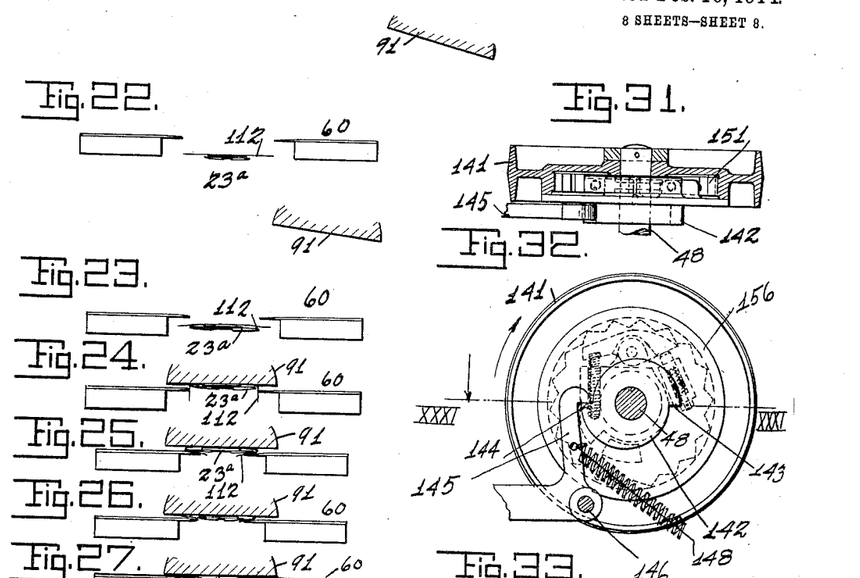
Figs. 22 to 30 show various steps and positions of the infolders, templet, and presser head while folding the article.
Fig. 31 is a section taken on a line XXXI—XXXI of Fig. 32, showing one form of clutch which may be employed.
Fig. 32 is a transverse section through the drive shaft showing the clutch and pulley in elevation.
Figures 27, 28, 29, 30, 33:
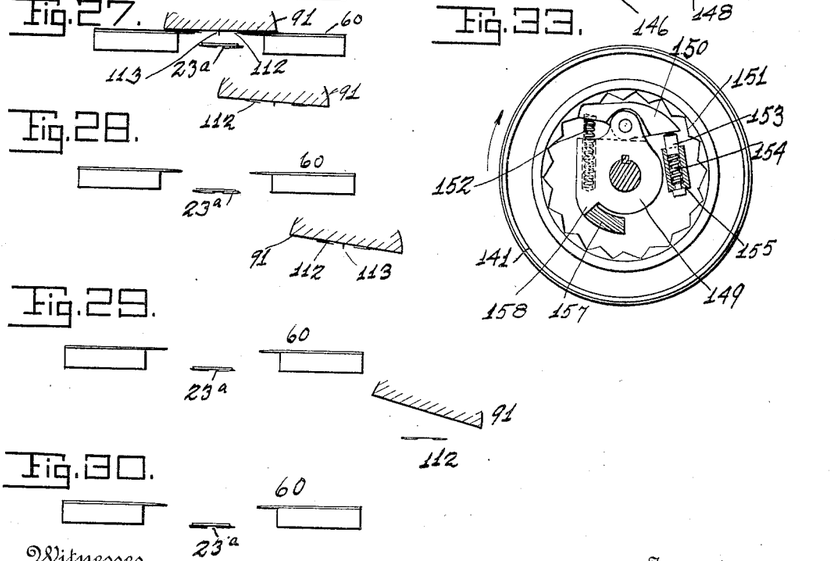
Fig. 33 is a detail view showing the interior of the clutch, said view being partly in section and partly in elevation.

The operation of the parts thus far described will be readily understood from the foregoing description when taken in connection with the accompanying drawings, and the several steps of the folding of the blanks will be more readily understood from the illustrations in Figs. 22 to 30. The parts as shown in Figs. 1, 2 and 3 are in their normal position, and the blank as 112, Fig. 22 is placed upon the templet or former so as to rest between the gages 59 located adjacent thereto, the infolders being far enough apart to permit this. The templet plates in an expanded position are then moved vertically above the infolding plates, the infolding plates having been previously moved inward just far enough to permit the templet plates to pass by the same as shown in Figs. 23 and 24, which will cause the infolders to engage the edges of the blank and force the same downward. As this operation is being effected, the presser and heating device 91 is being forced inwardly and downwardly so as to rest upon the blank lightly or otherwise while the infolding is taking place. The infolders are then forced farther inward as shown in Figs. 25 and 26, and the templet plates are collapsed as shown in Fig. 26 and removed from the blank leaving the same between the infolder plates and the presser plate as shown in Fig. 27. After the templet is removed the blank is pressed between the presser device and the infolders at the same time applying heat to the folded article so that the same will retain its shape, and owing to the yielding connection between the yoke or cross-head 94 and the rod 96, the said presser plate may be made to give the desired pressure to the article and the rods 96 permitted to move downward independent of the movement of said yoke. After the article has been pressed the infolders as well as the templet plates and the presser plates are restored to their former position by the mechanism already described, and as shown more clearly in Figs. 1 to 3, and diagrammatically in Figs. 28 to 30.

Figures 6, 6A, 7:
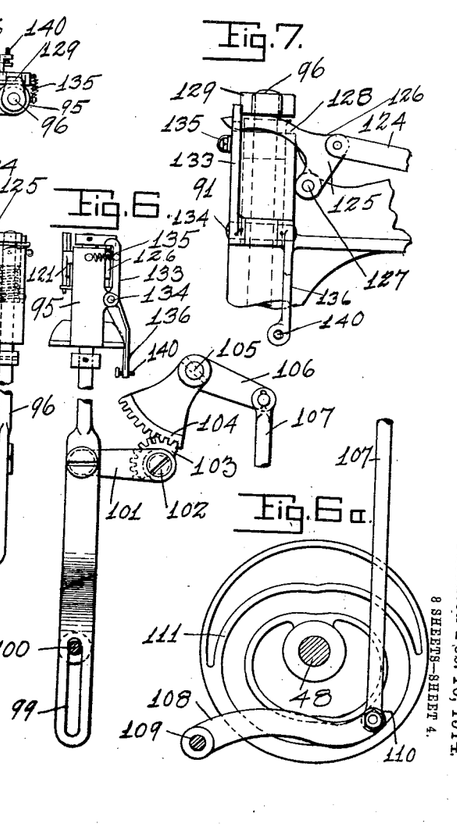
Fig. 6 is a side view of the parts shown in Fig. 5 in pressing position.
Fig. 7 is an enlarged fragmentary detail view of the locking means for holding the mechanism in position to deposit the articles after being folded on the table.

The articles after they are pressed may be automatically removed and deposited on a receiver or other means without any handling whatever. To effect this the presser plate 91 is provided with two angularly arranged apertures 113 in which are movably held the needles 114 and 115. The needle 114 is adjustably held to a rod 116, and this rod is connected by an arm 117 to a shaft 118 extending transversely of the yoke or head 94. An arm 119 is connected by a rod or link 120 to an arm 121 which is held at one end to a transverse shaft 122, and on the opposite end of said shaft 122 is an arm 123, and this arm is connected by a link 124 to an arm 125 of a bell-crank lever 126 which is pivoted to the yoke at 127, and has its arm 128 arranged in the path of a collar 129 carried by one of the rods 96. The shaft 122 carries an arm 130, and to this arm is held a rod or bar 131 which carries the needle 115 so that when the bell-crank lever 126 is operated by the movement of one of the rods 96, the rod or link 124 will move the needles 114 and 115 through the mechanism already described outwardly and downwardly through the openings 114 so as to pass through the article after it is folded, a spring 132 being provided to normally hold the shafts 118 and 122 in a position to force the bars 116 and 131 upward to carry the needles 113 and 115 within the device to cause the article to drop therefrom. By reason of the needles extending at an angle they will properly enter the fabric forming the folded article, and will hold the same as the device 91 is restored to its normal starting position. The needles are forced downward by the movement of the rods 96 as the article is being pressed, owing to the yielding connection between the rods 96 and the sleeves 95 of the yoke, which permits the bars to have a movement independent of said yoke, and as soon as the needles are forced outward to engage the article, a pawl 133 is made to engage the arm 128 of the bell-crank lever 126 to hold the needles in their outward position. This pawl 133 is pivoted at 134 to one of the sleeves 95 of the yoke 94, and is normally forced in one direction by a spring 135 as best shown in Figs. 6 and 7. When the presser device reaches the position shown in Figs. 1 to 3, the lower end 136 of the pawl will engage a stationary stop, as 137, arranged on a receiver 138 and will release the pawl 134, and as soon as the said pawl is released the spring 132 will quickly force the needles upward to the position shown in Fig. 5. This will cause the folded article to drop therefrom so that the latter will be deposited on the plate 139 of the receiver, the pawl 133 at its lower end being provided with an adjustable screw 140 to cause the pawl to properly engage the stop 137. As the articles are dropped from the presser plate or bed they will be deposited on a plate 139 of the receiver 138 and be properly stacked so that the attendant may readily remove the same in quantities therefrom, the said receiver being provided with a recessed part as at 140ª, Fig. 2, to permit the hand to be inserted under the articles. By this means the articles after they are folded are automatically removed from the infolders after being pressed, and are automatically deposited one on top of the other on the receiver without any handling whatever, thus avoiding the possibility of becoming soiled and permitting the attendant to more quickly place another blank in position to be folded.

The machine is preferably not operated continuously, and the main drive shaft which operates the several mechanisms is under the direct control of the attendant, and may be started and stopped at will, and the usual or any preferred means may be provided for this purpose. As shown the shaft 48 is provided with a belt pulley 141 which is loosely arranged on the shaft 48, and movable independent of the shaft is a clutch wheel 142. This wheel or disk 142 is provided with two stops or teeth 143 and 144 which are adapted to be engaged by a pawl 145 which is pivoted at 146 to the machine frame, on the outer end of which is arranged a treadle 147, the said pawl being normally forced in one direction in the path of engagement of the teeth of the disk 142 by means of a spring 148. A collar 149 is secured to the shaft 48, and this collar carries a pawl 150 which is adapted to engage the teeth 151 forming a part of the pulley 141, and carried by the collar 149 is a spring 152 which is arranged to force the pawl at the proper time into engagement with the teeth 151. The pawl 150 is pivoted to the collar 149 and has one end adapted to be engaged by a spring pressed bolt 153. This bolt 153 is normally forced outward by the spring 154 which is of greater tension than the spring 152, and said bolt is arranged in a boss 155 carried by a disk 156 which is loosely arranged on the shaft 48, and to which is held the wheel 142. The spring 152 normally forces the pawl 150 into engagement with one of the teeth 151 of the pulley 141, the stop 157 carried by the disk 156 at this time engaging the projection or tooth 158 of the collar 149 and the pin or bolt 153 resting against a part of the pawl 150. When the pawl 145 engages either tooth 143 or 144 it will stop the disk 156 from rotating and will also stop the parts carried thereby. The pin or bolt 153 will now compress the spring 152 and will force the pawl 150 out of engagement with the teeth 151, allowing the pulley 141 to rotate independent of the drive shaft 48.

From the foregoing it will be seen that simple and efficient means are provided whereby the blanks for collars and other articles may be automatically folded, heated and pressed; that parts of the apparatus may be used in other forms of folding machines for folding articles of the same general character; that the articles when folded may be automatically removed and deposited on a receiver conveniently arranged for being removed in quantities, thereby avoiding the necessity for handling the articles except for placing the blank upon the folding mechanism and for removing the articles after a number of them have been folded, leaving the attendant's hands entirely free and materially adding to the speed with which articles of this class may be folded, and at the same time permitting a much cheaper class of labor to be employed.

Having thus described my invention, I claim as new and desire to secure by Letters Patent:—

1. In an infolding machine, the combination with a templet having expanding and contracting plates, of infolders movable toward and under the same for folding the edges of the blank under the templet plates, means for pressing and heating the blank, together with mechanism for automatically actuating the templet plates, infolders and pressing and heating means whereby the blanks of collars and analogous articles may be folded and pressed automatically.

2. In an infolding machine, the combination with a templet having expanding and contracting plates, of infolders movable toward and under the same for folding the edges of the blank under the templet plates, means for pressing the blank, together with mechanism for automatically actuating the templet plates, infolders and pressing means.

3. In an infolding machine, the combination with a templet having expanding and contracting plates, of infolders movable toward and under the same for folding the edges of the blank under the templet plates while expanded, together with mechanism for automatically actuating the templet plates and infolders in sequence.

4. In an infolding machine, the combination with a templet having expanding and contracting plates, of means movable toward and under the templet for folding the edges of the blank about the templet on the under face thereof, and means for pressing the blank.

5. In an infolding machine, the combination with a templet having contracting and expanding plates forming a support for the blanks, of initial guides arranged convenient to the templet plates, means for elevating the templet plates to raise the blanks above the guides, infolders adapted to move under the templet plates and to fold the blank inward under the same, a presser device having a swinging and downward movement adapted to engage the blank primarily while held by the templet plates and the infolders and adapted to press the blank between the head and the infolders after the templet plates have been removed, means for contracting and expanding the templet plates, together with means for automatically operating the infolders and the presser device.

6. In an infolding machine, the combination with a templet having contracting and expanding plates forming a support for the blanks, of initial guides arranged convenient to the templet plates, means for elevating the templet plates to raise the blanks above the guides, infolders adapted to move under the templet plates, and to fold the blank inward under the same, a presser device located above the infolders and having a swinging and downward movement adapted to engage the blank and press the same primarily while held by the templet plates and the infolders and adapted to further press the blank between said device and the infolders after the templet plates have been removed, and means for contracting and expanding the templet plates.

7. In an infolding machine, the combination with a templet forming a bed for the blanks, of means for elevating the templet plates to raise the blanks, infolders adapted to move under the templet and to fold the blank inward under the same, a presser device located above the infolders and having a swinging and downward movement adapted to press the blank between the device and the infolders after the templet plates have been removed, together with means for automatically operating the infolders and the presser device.

8. In an infolding machine, the combination with a templet having contracting and expanding plates forming a support for the blanks, of means for elevating the templet plates to raise the blanks, means adapted to move under the templet plates and to fold the blank inward under the same, a heating device having a swinging and downward movement adapted to engage the blank and heat the same, and means for contracting and expanding the templet plates.

9. In an infolding machine, the combination with a templet having contracting and expanding plates forming a support for the blanks, of infolders adapted to move under the templet plates and to fold the blank inward under the same, and a presser and heating device having an inward and downward movement adapted to engage and press the blank between the device and the infolders.

10. In an infolding machine, the combination with a templet having contracting and expanding plates, infolders adapted to fold the blank with the templet plates as a guide, and a presser and heating device having an inward and downward movement from above the templet and infolders and adapted to press the blank between the device and the infolders after the templet plates have been removed.

11. In an infolding machine, the combination with a vertically movable support, of a templet having contracting and expanding plates carried by the said support, infolders movable inward toward the templet plates under the same, means for automatically raising the templet plates above the infolders, together with an inwardly and downwardly moving presser and heating device adapted to engage the blank while the templet plates are in an expanded position and to press the folded blank after said templet plates are contracted and removed.

12. In an infolding machine, the combination with a vertically movable templet having contracting and expanding plates, of infolders movable inward toward the plates and under the same, means for automatically raising the templet plates above the infolders, together with an automatically actuated inwardly and downwardly moving presser and heating device adapted to press the blank after being folded.

13. In an infolding machine, the combination with a vertically movable templet having contracting and expanding plates, of infolders movable inward toward the plates means for automatically raising the templet plates above the infolders while the latter have been partly moved inward, an inwardly and downwardly moving presser device adapted to press the folded blank, together with automatically actuated means for operating the templet plates and infolders in sequence.

14. In an infolding machine, the combination with a vertically movable templet having contracting and expanding plates and forming a support for collar blanks, of infolders movable inward toward the plates under the same, means for raising the templet plates above the infolders, together with an inwardly and downwardly moving presser and heating device adapted to heat and press the folded blank.

15. In an infolding machine, the combination with a templet having contracting and expanding plates, of infolders movable inward under the under face of the templet, downwardly moving means whereby the blanks may be pressed, eccentrics connected to the infolders, shafts to which the eccentrics are connected, gears arranged on the shafts, a drive shaft, and means connecting the drive shaft with the gears whereby the latter may be rotated to move the infolders.

16. In an infolding machine, the combination with a templet, of infolders having adjustable plates arranged in pairs and movable inward along one face of the templet, said infolders having two distinct movements one while folding wherein the infolders move in succession and in the other movement after the blank is folded in which the infolders move simultaneously, means whereby the blanks may be pressed, eccentrics connected to the infolders, shafts to which the eccentrics are connected, gears arranged on the eccentric shafts, a drive shaft, and means connecting the drive shaft with the gears whereby the latter may be automatically rotated to move the infolders.

17. In an infolding machine, the combination with a templet having contracting and expanding plates, of infolders having adjustably held plates arranged in pairs and movable inward under the templet plates, means whereby the blanks may be pressed, eccentrics connected to the infolders, shafts to which the eccentrics are connected, a drive shaft and means connecting the drive shaft with the eccentric shafts whereby the latter may be rotated to move the infolders.

18. The combination with a templet adapted to initially support the blanks and having contracting and expanding plates, of infolders, means for elevating the templet from a position normally below the infolders to a position above said infolders, means independent of the infolders and templet and movable from above at one side of the same for pressing the blanks after the templet plates have been removed and between said pressing means and the infolders, vertically disposed shafts, means carried by the shafts for operating the infolders, gears on said shafts, segments engaging the gears, a drive shaft, means for operating the drive shaft, a cam arranged on the drive shaft, a lever operated by the cam, and a link operatively connecting the lever to move the segments whereby the infolders may be automatically operated as the shaft is rotated.

19. The combination with a templet adapted to support the blanks and having contracting and expanding plates, of infolders, means for elevating the templet above the infolders, means for pressing the blanks, vertically disposed shafts, means carried by the shafts for operating the infolders, gears carried by said shafts, segments engaging the gears, a drive shaft, means for operating the drive shaft, a cam arranged on the drive shaft, a lever operated by the cam, and a link operatively connecting the lever to move the segments whereby the infolders may be automatically operated as the shaft is rotated.

20. In an infolding machine, the combination with a templet having contracting and expanding plates, of infolders adapted to engage the blank and fold the same inward on one face of the templet plates, arms operatively connected to move the templet plates, a rotary shaft carrying the arms, a sleeve, means for producing a relative movement between the shaft and sleeve, a gear secured to the sleeve, a key-and-slot connection between the shaft and the sleeve, a gear in mesh with the first-mentioned gear, a shaft to which the second gear is held, an arm connected to the shaft, a cam, a drive shaft to which the cam is secured, a lever operated by the cam, and a link connecting one end of the lever to the arm so as to operate the gears whereby the templet plates may be automatically expanded and contracted when the drive shaft is operated.

21. In an infolding machine, the combination with a templet having contracting and expanding plates, of vertically movable means supporting the templet, infolders adapted to engage the blank and fold the same inward on the under face of the templet plates, mechanism for automatically raising and lowering the templet plates, arms operatively connected to move the templet plates, a rotary shaft carrying the arms, a sleeve, a gear secured to the sleeve, a second gear, a shaft to which the second gear is held, an arm connected to the shaft, a cam, a drive shaft to which the cam is secured, a lever operated by the cam, and a link connecting one end of the lever to the arm so as to operate the gears whereby the templet plates may be automatically expanded and contracted when the drive shaft is operated.

22. In an infolding machine, the combination with a templet having contracting and expanding plates, of infolders adapted to engage the blank and fold the same inward on one face of the templet plates, arms operatively connected to move the templet plates, a rock shaft carrying the arms, a gear for operating the shaft, a gear in mesh with the first-mentioned gear, a shaft to which the second gear is held, an arm connected to the shaft, a cam, a drive shaft to which the cam is secured, a lever operated by the cam, and a link connecting one end of the lever to the arm so as to operate the gears whereby the templet plates may be automatically expanded and contracted when the drive shaft is operated.

23. In an infolding machine, the combination with a templet having contracting and expanding plates and initially supporting the blanks, of infolders normally located above the templet and adapted to engage the blank and fold the same inward under one face of the templet plates, means operatively connected to move the templet plates, a rock shaft connected to said means, a cam, a drive shaft to which the cam is secured, a lever operated by the cam, and means operated by the lever to impart movement to the first-mentioned shaft whereby the templet plates may be automatically expanded and contracted when the drive shaft is operated.

24. In an infolding machine, the combination with a templet having contracting and expanding plates, of infolders normally located above the templet and adapted to engage the blank and fold the same inward under the templet plates, arms operatively connected to move the templet plates, a rock shaft carrying the arms, a gear operating the shaft, a gear in mesh with the first-mentioned gear, a shaft to which the second gear is held, a cam, a drive shaft to which the cam is secured, and means operated by the cam for imparting movement to the gears.

25. In an infolding machine, the combination with a templet having contracting and expanding plates, of infolders located normally above the templet and adapted to engage the blank and fold the same inward on one face of the templet plates, arms operatively connected to move the templet plates, a shaft for operating the arms, a cam, a drive shaft to which the cam is secured, a lever operated by the cam and means operated by the cam for imparting movement to the gears.

26. The combination with a templet having contracting and expanding plates, of means for automatically expanding and contracting said plates, infolders located normally above the templet, means for automatically moving the infolders to force the blank inward under the edges of the templet plates, means for pressing the blanks after they are folded, a support for the templet plates, a link connected to the support, an arm connected to the link, a cam, a drive shaft to which the cam is held, a lever operated by the cam, and means connecting the lever to the arm whereby the templet plates may be automatically elevated above the infolders.

27. The combination with a templet having contracting and expanding plates, of means for automatically expanding and contracting said plates, infolders located normally above the templet, means for automatically moving the infolders to force the blank inward under the edges of the templet plates, means for heating and pressing the blanks after they are folded, a support for the templet plates, a cam, a drive shaft to which the cam is held, a lever operated by the cam and means connecting the lever to the support to elevate the templet plates above the infolders.

28. The combination with a templet having contracting and expanding plates, of means for automatically expanding and contracting said plates, infolders located normally above the templet, means for moving the infolders to force the blank inward under the edges of the templet plates, means for pressing the blanks after they are folded, a support for the templet plates, a drive shaft, and means operated by the drive shaft for elevating the templet plates above the infolders while the said infolders have been moved a part only of the distance inward.

29. The combination with a templet and infolding mechanism for folding collar blanks and analogous articles, of an inwardly and downwardly movable fold presser device entirely independent of and normally located above the templet and infolding mechanism having a plate adapted to engage the blank, a receiver, and means movable with the presser device adapted to engage the blanks after they are folded and as they are pressed for automatically removing the same from the folding means and to automatically deposit the same on the receiver.

30. The combination with a templet and infolding mechanism for folding collar blanks and analogous articles, of a receiver, an inwardly and downwardly movable fold pressing device independent of said templet and infolding mechanism and normally located above said mechanism, and means movable with the pressing device for automatically removing the blank from the folding means and deposit the same on said receiver.

31. The combination with means for folding collar blanks and analogous articles, of a presser and heating device having a plate adapted to engage the blank, a receiver having a recessed part, needles movable with the presser device adapted to engage the blanks after they are folded and as they are pressed for automatically removing the same from the folding means, and means for automatically operating the needles to deposit the same on said receiver.

32. The combination with means for automatically folding and pressing collars and analogous articles, of a movable presser device, means for moving said device inward and downward and outward again, bars arranged at an angle and slidingly held in the device, needles carried by the bars, arms and links normally forcing the needles in one direction, a spring tending normally to force the needles in the opposite direction, an automatic catch adapted to hold the needles in their outward position, a receiver, and means carried by the receiver whereby the catch may be released and the spring act to move the needles so as to deposit the articles on the receiver.

33. The combination with means for folding and pressing collars and analogous articles, of a movable device, means for moving the device inward and downward and outward again, bars slidingly held in the device, needles carried by the bars, arms and links normally forcing the needles in one direction, a spring tending normally to force the needles in the opposite direction, an automatic catch adapted to hold the needles in their outward position, a receiver, and means carried by the receiver whereby the catch may be released and the spring act to move the needles so as to deposit the articles on the receiver.

34. The combination with means for automatically folding and pressing collars and analogous articles, of a movable device, means for moving the device, needles carried by said device and movable therewith, a spring tending normally to force the needles in one direction, means held to the device for forcing the needles against the action of the spring, an automatic catch adapted to hold the needles in this position, a receiver, and means whereby the catch may be released and the spring act to move the needles so as to deposit the articles on the receiver.

35. In an infolding machine, the combination with means for folding blanks of collars and analogous articles, of a movable device, means for moving the device, bars arranged at an angle and slidingly held in said device, needles carried by the bars, means tending normally to force the needles in one direction, means held to the device for forcing the needles in the opposite direction, means adapted to hold the needles in their outward position, a receiver, and means whereby the articles may be released and deposited on the receiver.

36. The combination of a templet and infolders forming means for folding blanks of collars and analogous articles, a movable fold pressing device entirely independent of the templet and infolders and of their movements, means for moving the device, needles carried by the device, and means for operating the needles to engage the articles and remove them after being folded.

37. The combination of a templet and infolders for folding blanks of collars and analogous articles, of a fold pressing device entirely independent of the templet and infolders, means for moving the device downward, needles carried by the device and angularly arranged therein, and means for moving the needles to engage the articles and remove them after being folded.

38. The combination with means for folding the blanks of collars and analogous articles, of a movable device, means for moving the device inward and downward and outward again, angularly arranged needles carried by and movable in the device, a spring tending normally to force the needles in one direction, means held to the device and normally forcing the needles against the action of the spring, a receiver, and means whereby the needles may be made to automatically deposit the articles on the receiver.

39. In an infolding machine, the combination with means for folding collar blanks and analogous articles, of a presser device having a plate adapted to engage the blank, a receiver, and needles carried by the presser device and adapted to engage the blanks and automatically remove the same from the folding means during its movement and to automatically deposit the same on the receiver.

40. In an infolding machine, the combination with means for folding collar blanks and analogous articles, of a presser device having a heating and pressing plate located above the folding means and adapted to engage the blank, a receiver, means movable with the presser device and adapted to engage the blanks and remove the same from the folding means and to automatically deposit the same on the receiver, and means for operating said presser device and yieldingly connected thereto.

41. In an infolding machine, the combination with a templet having contracting and expanding plates adapted to support collar blanks and the like, of infolders adapted to move inwardly to fold the blanks about the templet plates, a downwardly and inwardly moving presser and heating device adapted to engage the blank and press the same after it has been folded and during its downward movement, means carried by the pressing device adapted to engage the folded blanks for removing the same after being folded, a receiver, means whereby the folded blanks may be deposited on the receiver, a drive shaft, together with mechanism for operating automatically and in regular sequence the templet plates, infolders, presser device and blank-removing means.

42. In an infolding machine, the combination with a templet having contracting and expanding plates, of infolders adapted to move inwardly to fold the blanks about the templet plates, a downwardly movable fold presser and heating device adapted to engage the blank and press the same after it has been folded, means carried by the pressing device adapted to engage the folded blanks during the act of pressing for removing the same after being folded, a receiver, means whereby the folded blanks may be deposited on the receiver, a drive shaft, together with mechanism for operating automatically and in regular sequence the templet plates, infolders, presser device and blank-removing means.

43. In an infolding machine, the combination with a templet having contracting and expanding plates, of infolders adapted to move inwardly to fold the blanks about the templet plates, a downwardly and inwardly moving fold presser device adapted to engage the blank and press the same, means carried by the presser device adapted to engage the folded blanks during the act of pressing for removing the same after being folded, together with mechanism for operating automatically and in regular sequence the templet plates, infolders, presser device and blank-removing means.

44. In an infolding machine, the combination with a templet having contracting and expanding plates, of infolders adapted to move inwardly to fold the blanks about the templet plates, a presser device adapted to engage the blank and press the same, means adapted to engage the folded blanks during the act of pressing and remove the same after being folded above the infolders and templet, a receiver, means whereby the folded blanks may be deposited on the receiver, together with mechanism for operating automatically and in regular sequence the templet plates, infolders, presser device and blank-removing means.

45. In an infolding machine, the combination with means for folding collar blanks and analogous articles, of an inwardly and outwardly moving presser device, means carried thereby for heating the blanks, rods movable with said device and suitably guided on a part of the machine, a shaft, arms connected to the rods, a segment carried by the shaft, a second segment in mesh with the first-mentioned segment, a rod operatively connected to the second segment, a drive shaft, a cam secured to the drive shaft and operating the rod, and a lever to which one end of the rod is pivoted, whereby the said presser device may be automatically forced inward and downward and then outwardly again as the said shaft is rotated.

46. In an infolding machine, the combination with means for folding collar blanks and analogous articles, of a presser device, rods movable with said device and suitably guided on a part of the machine, a shaft, arms connected to the rods a segment carried by the shaft, a second segment in mesh with the first-mentioned segment, a rod operatively connected to the second segment, a drive shaft, and a cam secured to the drive shaft and operating the rod.

47. In an infolding machine, the combination with means for folding collar blanks and analogous articles, of a presser device, means carried thereby for heating said device, rods movable with said device, and suitably guided on a part of the machine, a shaft, arms connected to the rods, means for operating the arms, a rod operatively connected to the presser-device rods, a drive shaft, and a cam secured to the drive shaft and operating the rod.

48. In an infolding machine, the combination with means for folding collar blanks and analogous articles, of a presser-device, rods yieldingly held to and movable with said device, and suitably guided on a part of the machine, a shaft, arms connected to the rods, means for operating the arms, a rod operatively connected to the presser-device rods, a drive shaft, and a cam secured to the drive shaft, and operating the rod.

49. In an infolding machine, the combination with a vertically movable blank-supporting templet having expanding and contracting plates adapted to initially support the blanks to be folded, of infolders having opposed independently movable members adapted to move toward and from the templet to fold the blank about the same, together with means for moving the infolders inward a distance substantially to the size of the templet plates to intercept the blank in its movement when said plates are expanded and to further move the infolders in succession to fold the blank about and under the templet plates.

50. In an infolding machine, the combination with a templet having expanding and contracting plates adapted to support the blanks, of means for raising and lowering the templet, infolders provided with opposed members and having two inward movements one movement carrying the infolders substantially equal to the templet plates when in an expanded position so as to intercept the blanks in their upward movement with the templet to fold the edge downward and a further movement after the templet plates have been raised to force the edges of the blank inwardly under the templet plates.

51. In an infolding machine, the combination with a templet having expanding and contracting plates, of means for raising and lowering the templet, infolders provided with opposed members and having two inward movements one movement carrying the infolders substantially equal to the templet plates when in an expanded position so as to intercept the blanks in their upward movement with the templet to fold the edge downward and a further movement after the templet plates have been raised to force the edges of the blank inwardly under the templet plates.

52. In an infolding machine, the combination with a templet having expanding and contracting plates adapted to support the blanks, of means for raising and lowering the templet, infolders provided with opposed members and having two inward movements one movement carrying the infolders substantially equal to the templet plates when in an expanded position so as to intercept the blanks in their upward movement with the templet to fold the edge downward and a further movement in succession after the templet plates have been raised to force the edges of the blank inwardly under the templet plates.

53. In an infolding machine, the combination with a templet having expanding and contracting plates adapted to support the blanks, of means for raising and lowering the templet, infolders provided with opposed members and having two inward movements one movement carrying the infolders substantially equal to the templet plates when in an expanded position so as to intercept the blanks in their upward movement with the templet to fold the edge downward and a further movement after the templet plates have been raised to force the edges of the blank inwardly under the templet plates, together with a presser-device having two movements adapted to engage and press the folded blank.

54. In an infolding machine, the combination with a templet having expanding and contracting plates adapted to support the blanks, of means for raising and lowering the templet, infolders provided with opposed members and having two inward movements one movement carrying the infolders substantially equal to the templet plates when in an expanded position so as to intercept the blanks in their upward movement with the templet to fold the edge downward and a further movement after the templet plates have been raised to force the edges of the blank inwardly under the templet plates, pressing and heating means, together with means for automatically removing the folded blank.

55. In an infolding machine, the combination with a templet having expanding and contracting plates adapted to initially support the blanks to be folded, of infolders located before folding above the templet for folding the blanks about the templet, means independent of the templets and infolders whereby the folded blank may be pressed and movable above the infolders and templets, means for automatically operating the parts in regular sequence, together with means for permitting the parts to operate continuously or to permit them to be stopped before all the parts have completed their movement.

This specification signed and witnessed this 27th day of May, A. D. 1908.

BENJAMIN W. TUCKER.

Witnesses:
FREDERICK B. BLACKMAN,
L. R. COMPTON.

---

Copies of this patent may be obtained for five cents each, by addressing the "Commissioner of Patents, Washington, D. C."